(12) United States Patent
Wu et al.

(10) Patent No.: US 8,416,685 B2
(45) Date of Patent: Apr. 9, 2013

(54) FLEXIBLE RESERVATION REQUEST AND SCHEDULING MECHANISMS IN A MANAGED SHARED NETWORK WITH QUALITY OF SERVICE

(75) Inventors: Zong Liang Wu, San Diego, CA (US); Ronald Lee, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 427 days.

(21) Appl. No.: 12/709,435

(22) Filed: Feb. 19, 2010

(65) Prior Publication Data

US 2010/0214916 A1 Aug. 26, 2010

Related U.S. Application Data

(60) Provisional application No. 61/154,335, filed on Feb. 20, 2009.

(51) Int. Cl.
*H04L 1/00* (2006.01)
(52) U.S. Cl. ............ 370/230; 370/252; 370/468; 725/95
(58) Field of Classification Search .......... 370/229–235, 370/252, 253, 468; 725/95–97
See application file for complete search history.

(56) References Cited

U.S. PATENT DOCUMENTS

| | | | |
|---|---|---|---|
| 2008/0192752 A1 | 8/2008 | Hyslop et al. | |
| 2008/0279219 A1 | 11/2008 | Wu et al. | |
| 2008/0298241 A1* | 12/2008 | Ohana et al. | 370/235 |
| 2010/0158021 A1* | 6/2010 | Kliger et al. | 370/400 |

* cited by examiner

*Primary Examiner* — Pao Sinkantarakorn
(74) *Attorney, Agent, or Firm* — Bruce Greenhaus; Richard Bachand; Sheppard Mullin Richter & Hampton LLP

(57) ABSTRACT

Systems and methods for scheduling network communications in a managed network can include receiving in a Network Coordinator a submission from each of a plurality of network nodes requesting, for their respective flows, reservation of communication slots in a communication window, the submission including scheduling information such as latency tolerance maximum aggregation amount; the Network Coordinator checking available bandwidth in the communication window; and the Network Coordinator allocating the available bandwidth to a first flow from a first requesting node based on the first flow's scheduling information and the bandwidth availability, and deferring allocation of bandwidth to a second flow from a second requesting node until a later window based on the second flow's scheduling information and the bandwidth availability, thereby reallocating peak demand among the plurality of requesting nodes across a plurality of communication windows.

42 Claims, 6 Drawing Sheets

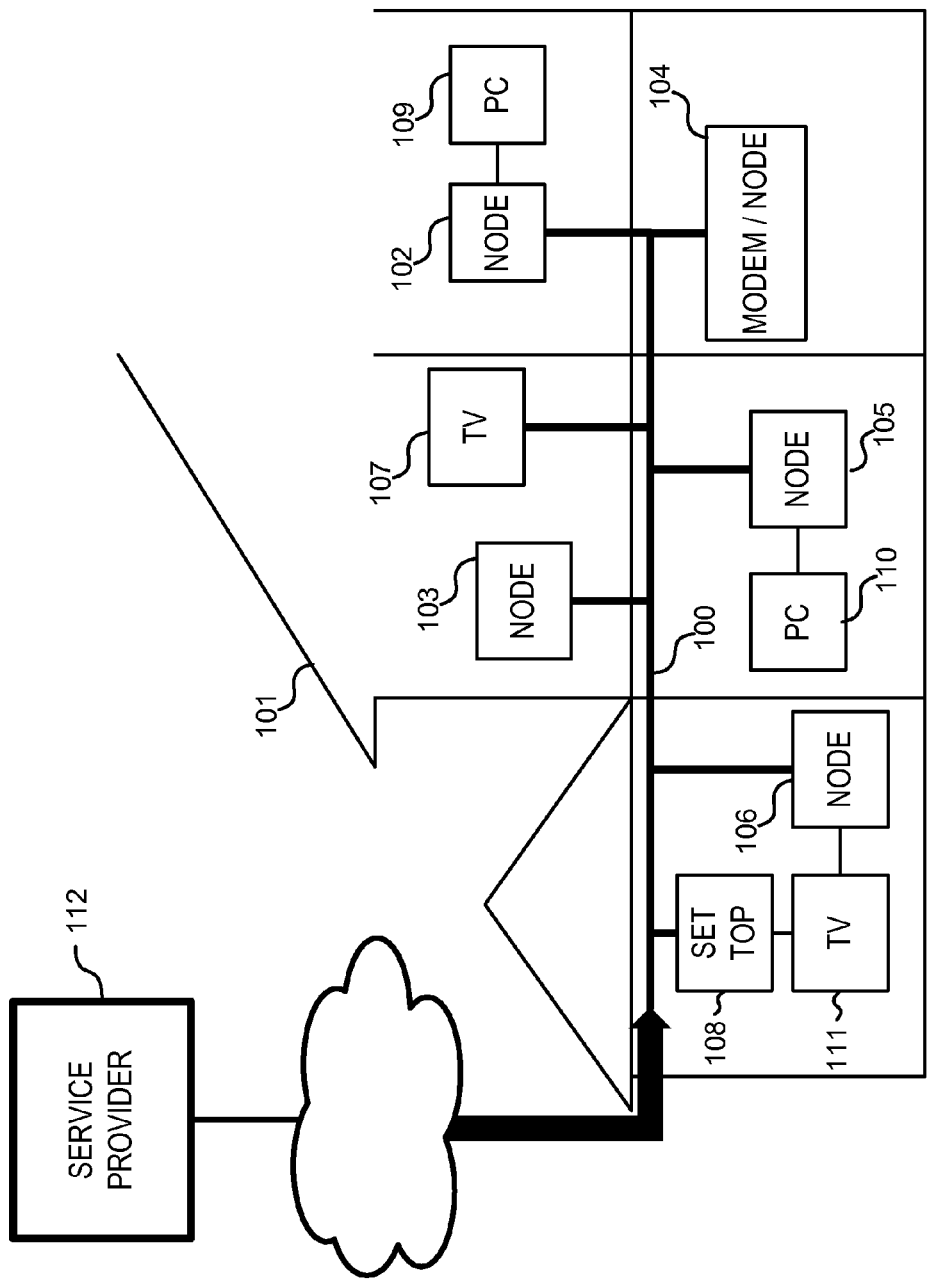

FLEXIBLE RESERVATION REQUEST AND SCHEDULING MECHANISMS IN A MANAGED SHARED NETWORK WITH QUALITY OF SERVICE

CROSS-REFERENCE TO RELATED APPLICATIONS

This application claims the benefit of U.S. Provisional Application No. 61/154,335, filed Feb. 20, 2009, which is herein incorporated by reference in its entirety.

TECHNICAL FIELD

The presently disclosed method and apparatus relates generally to communication networks, and more particularly, some embodiments relate to scheduling mechanisms to improve bandwidth utilization.

DESCRIPTION OF THE RELATED ART

A home network may include several types of devices configured to deliver subscriber services throughout a home. These subscriber services include delivering multimedia content, such as streaming audio and video, to devices located throughout the home. As the number of available subscriber services has increased and they become more popular, the number of devices being connected within each home network has also increased. The increase in the number of services and devices increases the complexity of coordinating communication between the network nodes.

The network of FIG. 1A is one example of a Multimedia over Coax Alliance (MoCA) network implemented in a home. A wired communications medium 100 is shown. The wired communications medium might be a coaxial cable system, a power line system, a fiber optic cable system, an Ethernet cable system, or other similar communications medium. Alternatively, the communications medium might be a wireless transmission system. In the embodiment of FIG. 1A, the communications medium 100 is preinstalled coaxial cabling deployed within a residence 101.

The network of FIG. 1A comprises a plurality of network nodes 102, 103, 104, 105, 106 in communication according to a communications protocol. For example, the communications protocol might conform to a networking standard, such as the well known MoCA standard. In the example of FIG. 1A, the communications protocol specifies a packet based communications system.

In some cases, activity on the network is controlled by a Network Coordinator (NC). In such networks, the NC manages access to the shared communications medium and manages the "quality-of-service" of transmissions on the network. In one such case, one of the nodes is selected to perform the functions of the NC based upon a process defined by the communications protocol. For example, in a MoCA network, the first node to communicate over a communication medium will search to see whether any other node is already performing the functions of the NC. Being the first node, there will not be another node yet on the network. Accordingly, the first node will become the NC. When a second node does a similar search, the first node will be sending out a beacon that will be detected by the second node. An admission process will occur between the nodes according to the admission procedures of the MoCA protocol. The result of the admission process will be the admission of the second node to the network created by the first node. The NC also performs admission procedures when any other new node requests admission to the network.

After one or more nodes join the network, a protocol is used to select one of the nodes to become the new NC by using a set of well defined criteria.

In networks employing an NC, the NC schedules network communications between network nodes using a Media Access Plan (MAP). The MAP is sent as a packet. Such MAP packets are sent on a regular basis. MAPs schedule all of the traffic on the medium 100. That includes scheduling the times during which nodes can transmit. Transmit times for data packets are scheduled by the NC in response to reservation requests by the nodes of the network. The NC may also schedule control and management packets on its own (without prior reservation requests).

Referring back to FIG. 1A, a node 102 serves as a network communications module (e.g., a MoCA node) and is coupled to one of the computers 109. Such nodes allow the computers 109 to communicate on the communications medium 100 in accordance with the communications protocol used on the medium 100. A node 106 is shown as a module associated with a television 111 to allow the television to receive and display media streamed from one or more other network nodes. Alternatively, a node might be associated with (i.e., coupled to or integrated into) a speaker or other music or video device 103. A node might also be associated with a module configured to interface with an internet or cable service provider 112, for example to provide Internet access, digital video recording capabilities, media streaming functions, or network management services to the residence 101.

Referring once again to MoCA as an example, a MoCA network utilizes a centralized NC to set up network communications among nodes. Each unidirectional traffic stream of data packets is identified by a "Flow ID". For the purposes of this disclosure, a "flow" is a communication of information organized as a stream of packets transmitted between a transmitting node and at least one receiving node. A flow will typically include a set of related information to be communicated from the transmitting node to the receiving node. The information may be a digital stream of data representing the entire content of a movie to be displayed on a television or other video monitor. The entire stream of data used to stream the movie may be associated with one flow. As such, a unique flow ID will be assigned to the flow and will be associated with all of the packets required to be transmitted from a transmitting node 102 to the receiving node 106 to stream the content of the movie to the receiving node 106 (i.e., all of the packets of the flow).

The transmitting node 102 may set up as many flows as the node 102 requires to communicate with the other nodes of the network. For example, a second flow may be concurrently set up between the node 102 and another node 105 to allow a document to be sent from the personal computer 109 to the personal computer 110.

Some home networks specify quality of service (QoS) parameters to ensure that an appropriate priority is set for the communications that occur on the network. QoS parameters can also be used to ensure that sufficient resources are allocated to the communication of user content without undesirable interruptions or delays. For example, a user that is playing a video game will only have a desirable experience if the commands that he provides are communicated to the game console and then displayed on the monitor or television rapidly. Delays in implementing such gaming commands can significantly impair the quality of the experience. Accordingly, the use of QoS parameters and protocols can help ensure a satisfactory user experience while ensuring that resources are not unnecessarily expended on communicating information more rapidly than is necessary if the content has a high tolerance for latency (i.e., delay).

In a home network, QoS can be classified into two main categories: Parameterized QoS (PQoS) and Prioritized QoS. Parameterized QoS provides a quantified measure of quality which is defined by a "Traffic Specification" (TSPEC) for each flow. The TSPEC of a Parameterized QoS flow defines the requirements and parameters of the flow. The TSPEC of a PQoS flow typically includes information like Peak Rate, Maximum Packet Size, etc. For example, in a MoCA network in which PQoS is implemented, the Peak Rate parameter indicates the maximum amount of data (in bytes) that will need to be transmitted in a very short time interval (like a MAP cycle). Each Parameterized QoS flow must first go through a formal PQoS flow admission process before the flow is allowed to start any data packet transmission. The PQoS flow admission process allows all the nodes involved in the flow to reserve appropriate node level resources (like buffers) and network level resources (like network transmission time and timeliness of such transmissions), in order to guarantee the QoS (that the parameters associated with the TSPEC can be met). Once a PQoS flow is "admitted", the resources necessary to transmit the entire flow from the transmitting node to one or more receiving nodes timely are guaranteed. If a PQoS flow is rejected after the PQoS flow admission process, the PQoS flow cannot be started. On the other hand, for Prioritized QoS, there is no admission process. Each Prioritized QoS flow is assigned a priority by the node sending the flow. Assigning a priority merely places the flow in a priority group. Those flows that are in the group having the highest priority will be allowed to transmit before flows that are in group having a relatively lower priority. However, unlike PQoS flows, prioritized QoS flows are not guaranteed to get the resources necessary to ensure that packets of the flows are transmitted.

Only PQoS flows must go through the PQoS flow admission process in order for the NC to reserve a certain amount of the network bandwidth and in order for the nodes involved to reservation enough node level resources, to ensure that the resources required by the PQoS flows will be available when needed during the actual data packet transmission phase. The data phase of a PQoS flow is the phase during which the transmit node actually makes reservation requests for individual or groups of data packets of the flow. In addition, during the data phase a reservation request is "granted" (i.e., scheduled) or discarded by the NC, depending on the availability of network bandwidth for this request. The NC then transmits a MAP to indicate the schedule to all of the nodes of the network, including the requesting node. Each requesting node then transmits the packets according to the schedule indicated by the MAP. Further details regarding MAPs and reservation requests are provided below.

The data phase of a PQoS flow can start only after the PQoS flow admission phase is successful. Since resources are not guaranteed to other (i.e., Prioritized) QoS flows, a node can always down-grade a rejected PQoS flow to a Prioritized QoS flow, and start transmitting the flow with Prioritized QoS level.

Among PQoS flows, each flow may be assigned a priority (similar to a prioritized QoS flow) in order to create further differentiation among all PQoS flows. However, even if assigned a low relative priority, PQoS flows will always be transmitted before non-PQoS flows, such as prioritized QoS flows, if the bandwidth reserved for PQoS flows has not been completely used by other PQoS flows. If there is insufficient bandwidth reserved for PQoS flows to transmit all of the PQoS packets to be transmitted, then those packets associated with PQoS flows that have higher priorities will be transmitted first.

A MAP cycle is about one millisecond long. The MAP cycle is divided into time slots. During each MAP cycle, the NC transmits a MAP packet that indicates which nodes will transmit during each time slots of the next MAP cycle (including which slot in the next MAP cycle will contain the next MAP packet).

FIG. 1B is a timing diagram that illustrates the timing relationship between MAPs 201, 202 and MAP cycles 203, 205. The MAP cycle 205 is defined as the communication activity on the channel under the control of the previously sent MAP 201. Accordingly, each MAP 201 schedules all of the communication activity for the next MAP cycle 205. Only one such "next MAP cycle" 205 is shown in Figure x, however, it will be understood that MAP 202 schedules all communications for the MAP cycle that follows MAP cycle 205 (not shown). It should be noted that the next MAP 202 is sent during the next MAP cycle 205 under the scheduling control of the previous MAP 201. Accordingly, MAP 201 determines the following information for each packet to be sent in the next MAP cycle 205: i) packet start time; ii) packet duration; iii) source node; and iv) destination node(s). Similarly, MAP 202 determines this information for the MAP cycle that follows (not shown). The combination of a packet start time, the packet duration for the packet to be sent at that start time, and the source node and destination node(s) for that packet are referred to herein as a "transmission slot assignment". It should be noted that as provided herein, packet length is the number of bytes in a packet and packet duration is the amount of time required to transmit that number of bytes.

One particular type of packets that the MAP 201, 202 is responsible for scheduling is reservation requests (RR) 207, 209, 211. Six such RRs are shown in the first MAP cycle 203 of Figure x, starting with the first RR 207 and ending with the last RR 209. One RR 211 is shown in the second MAP cycle 205. Each RR 207, 209 is sent from one node. Each RR 207, 209 may contain one or more Reservation Request Elements (RREs). Each RRE communicates information regarding a desire on the part of the node from which the RR 207, 209 was sent to transmit one MoCA packet containing one or more Ethernet packets. A MoCA packet can contain more than one Ethernet packet through a process called Aggregation.

From this, it can be seen that RRs 207, 209, 211 are sent by client nodes (i.e. transmit nodes) to indicate that the corresponding client nodes have packets that they wish to send and thus to request that the NC schedule one or more time intervals during a subsequent MAP cycle when the client nodes can send those packets. Accordingly, when the next packet or set of packets of a flow are ready for transmission, the client node must first wait for the NC to allocate a time when the client node can send an RR 207, 209, 211. Once the NC has allocated a time during which the client node can sent an RR 207, 209, 211, the client node communicates the RR 207, 209, 211 to the NC at the time allocated (i.e., at the packet start time and for the packet length indicated by the MAP 201, 202). Note that the FIG. 1B shows the case where these RRs 207, 209 are transmitted in time order. However, in some systems (not shown), an Orthogonal Frequency Division Multiple Access (OFDMA) scheme can be used. In such an OFDMA scheme, each of the RRs is modulated on a separate group of subcarriers and all the RRs are transmitted at the same time by different requesting nodes.

The RR 207, 209 allows a client node to communicate to the NC that the client node has data packets it wishes to send. Furthermore, the RR 207, 209 indicates the associated destination node(s), packet length (from which the packet duration can be determined), packet priority, Flow ID and so on for those data packets. The NC uses this information to schedule "transmission slots" during which the client node can transmit those data packets it wishes to send. The NC then communicates that schedule by generating and transmitting the MAP 201 having transmission slot assignments for the next MAP cycle 205. A non-PQoS (i.e. Prioritized QoS) RRE is one for a non-PQoS flow, while a PQoS (i.e. Parameterized QoS) RRE is one for a PQoS flow. Any RRE that the NC cannot schedule in the next MAP cycle 205 is discarded and must be retransmitted by the node from which they originated.

In order for the NC to guarantee that all admitted PQoS flows will have all of the resources that are required, the NC must determine how much bandwidth will be required by each PQoS flow and within what latency limit.

It should be understood that in a network supporting PQoS, any PQoS flow is guaranteed to be sent within a relatively short predetermined amount of time (typically some milliseconds), regardless of the priority assigned to the PQoS flow. The NC determines how much bandwidth is required by evaluating the set of parameters provided in the TSPEC of the flow. As noted above, the TSPEC typically includes the maximum packet size, peak rate, etc. Typically a network supporting Parameterized QoS uses up to a given percentage of total network capacity for supporting PQoS flows. For example, an NC can reserve 80% of the transmission slots within each MAP cycle for assignment to PQoS flows. By determining how much bandwidth is required for a new PQoS flow and how much has been reserved for existing PQoS flows, the NC can determine if it has enough capacity to admit the new PQoS flow. Once a new PQoS flow is admitted, the NC ensures that there is sufficient bandwidth available for the new PQoS flow.

Since these PQoS flows are typically independent, their peak traffic periods may or may not happen at, or around, the same time. In order to ensure that the PQoS flow requirements can be supported, the NC reserves sufficient bandwidth to handle the peak rate set forth in any request the node might make. Therefore, if a given amount of MoCA bandwidth is reserved to support worst-case peak PQoS flow periods, the amount of MoCA bandwidth set aside is typically significantly greater than the average bandwidth actually used for PQoS traffic. That is, to account for the worst-case peak-rate scenario taking into account that flows are independent events unevenly distributed over time, and in fact can often be very bursty, the NC must reserve network bandwidth of PQoS priority that significantly exceeds the average aggregate amount of PQoS bandwidth that are actually used, thereby limiting the number of PQoS flows and their aggregate bandwidth that can be admitted into the network, for a given total amount of PQoS bandwidth in the network. Therefore, there is a need for method and apparatus that allows an NC and transmit nodes to more efficiently reserve and allocate PQoS bandwidth.

Furthermore, for both PQoS and Prioritized QoS flows, overall network efficiency is increased if each flow can maximize its packet aggregation. Therefore, there is a need for method and apparatus provide greater aggregation efficiency in the scheduling of transmission slots.

Still further, according to the MoCA 1.1 industry standard, reservation requests are generated when data packets are already in the requesting node's data buffers and ready for transmission. Since a reservation request is not made until the data packets are in the transmitting node's buffer, efficiency that could have been gained when a node knows that packets are imminent is lost. Therefore, there is a need for method and apparatus that allows an NC to more efficiently reserve bandwidth and to allow nodes of a home communications network to make a reservation request prior to a packet being present in the transmitting node's buffer.

SUMMARY

In one embodiment of the disclosed method and apparatus, a PQoS flow admission process includes providing a "Transmission Specification" (TSPEC) that includes additional information over what is provided in a conventional admission process to allow the network coordinator (NC) to admit PQoS flows in a manner that better utilizes bandwidth that has been reserved for PQoS flows. In particular, in one embodiment the PQoS flow admission process includes an indication of a new parameter defined as "Short Term Average Rate" (STAR). In one embodiment the STAR is equal to a value referred to as the Cost Function of the flow. In an alternative embodiment, the STAR is used together with the latency tolerance to determine the Cost Function of the flow. In addition, during the PQoS flow admission process, the NC considers the amount of bandwidth reserved in the network for PQoS flows. The NC admits a PQoS flow based on the remaining available PQoS bandwidth taking into account the flow's STAR and the amount already allocated to other previously admitted PQoS flows.

In addition, the disclosed method and apparatus provides a process for making a reservation request for one or more communication slots in a communication window (such as a MoCA MAP cycle) during which packets of the requesting nodes respective flows can be transmitted. One such a reservation request in accordance with the disclosed method and apparatus includes scheduling information and is referred to as an "Opportunistic Reservation Request" (ORR). Such scheduling information comprises at least one of the following: (1) latency tolerance of the flow being requested and (2) whether the requesting network node has reached its maximum aggregation amount. Using the scheduling information, the NC can defer allocation of any PQoS bandwidth away from packets of a PQoS flow that can tolerate delay. Shifting the allocation of PQoS bandwidth until a later window based on the flow's scheduling information and the availability of PQoS bandwidth allows the NC to reallocate the demand among the plurality of requesting nodes across a plurality of communication windows.

In one embodiment, all the Reservation Request Elements (RREs) are classified into following "QoS priority levels": (1) PQoS RRs, (2) PQoS ORRs, (3) Priority High RRs, (4) Priority Medium RRs, (5) Priority Low RRs, (6) Priority Background RRs, (7) Priority High ORRs, (8) Priority Medium ORRs, (9) Priority Low ORRs, (10) Priority Background ORRs. In addition to this hierarchy, RREs within the same QoS priority level that are requesting a transmission slot for a packet that has reached a maximum aggregation amount move higher up the hierarchy.

In accordance with one embodiment of the disclosed method and apparatus, a node can elect to use either an ORR element or a conventional RRE. In one such embodiment, an ORR element is identified by a flag in the ORR element. If that flag is not set, then the request is a conventional RRE. Since conventional PQoS RREs do not have a latency tolerance parameter, it is assumed that the packet must be transmitted immediately. Accordingly, conventional PQoS RREs are given the highest priority. Likewise, convention Prioritized RREs are given a higher priority than Prioritized ORR elements.

In one embodiment, the NC evaluates the scheduling information for each of the RREs in an order of priority, from a highest priority RRE to a lowest priority RRE. Typically, this can be done by grouping the RREs into a group with other RREs of the same type and with the same parameters. For example, all PQoS RREs for packets that have a time to live having a value equal to one MAP cycle and which have reached their maximum aggregation amount are grouped together and allocated a transmission slot first. All of the RREs for packets that have a time to live value equal to one MAP cycle and which have not reached their maximum aggregation amount are grouped together and allocated the next set of transmission slots. This grouping and allocation goes on until all of the transmission slots for the next MAP cycle have been allocated. Further information about the particular hierarchy is provided below.

In various embodiments, the latency tolerance information can be a binary representation as to whether or not a flow can tolerate any latency. Alternatively, the latency tolerance information can be information regarding an amount of latency a flow can tolerate. The value of the latency tolerance may be provided in numbers of MAP cycles, in milliseconds, or in any other format that allows the NC to properly prioritize the RREs.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

The disclosed method and apparatus is described in detail with reference to the following Figures. The drawings are provided for purposes of illustration only. Accordingly, these drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

FIG. 1A illustrates an example of one environment in which some embodiments of the disclosed method and apparatus may be implemented.

Figure 1B:
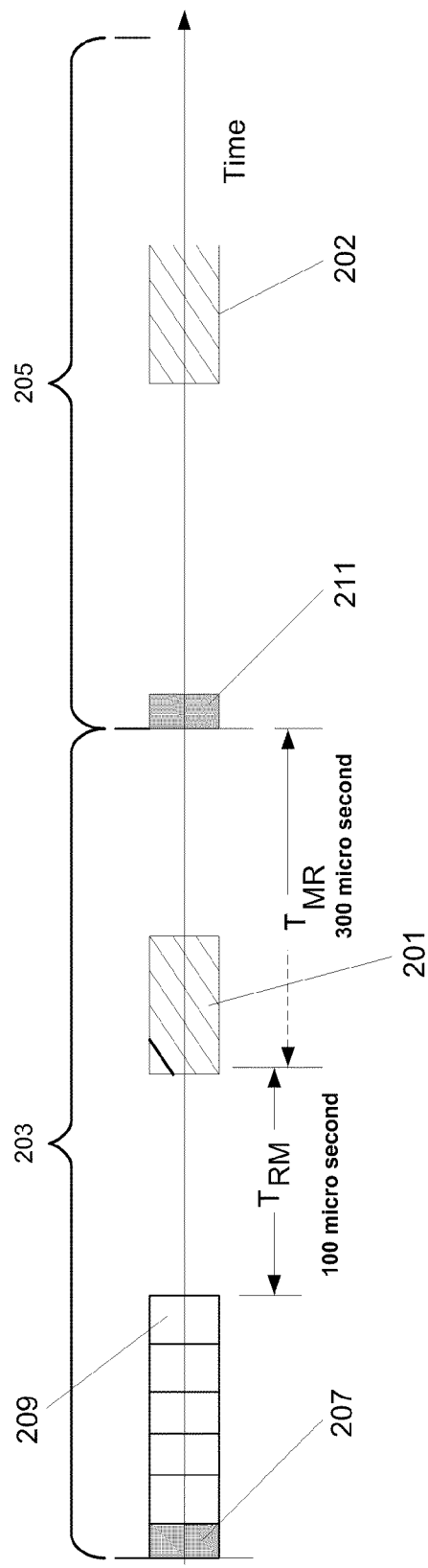
FIG. 1B is a timing diagram that illustrates the timing relationship between MAPs and MAP cycles.

The Figures are not intended to be exhaustive or to limit the claimed invention to the precise form disclosed. It should be understood that the disclosed method and apparatus can be practiced with modification and alteration, and that the claimed invention should be limited only by the claims and the equivalents thereof.

DETAILED DESCRIPTION

According to various embodiments of the disclosed method and apparatus, nodes on a network (also referred to as network devices) and a Network Coordinator (NC) enter a PQoS flow admission process for a PQoS flow in order to allocate resources by the NC and each of the nodes that will either be receiving or transmitting packets of the flow (i.e., gain admission of the PQoS flow). The NC determines whether to admit the PQoS flow based on parameters provided in a "Traffic Specification" (TSpec), including a parameter referred to herein as Short Term Average Rate (STAR) and including a latency tolerance parameter. The TSpec indicates what is necessary for the information transmitted in a flow to be transmitted and received at the other end in a manner that provides a satisfactory user experience. For the purposes of this disclosure, a "flow" is a communication of packets of information between a transmitting node and at least one receiving node.

In one embodiment of the disclosed method and apparatus, the NC reserves a predetermined amount of bandwidth for PQoS flows. If there is sufficient bandwidth to ensure that all packets of the flow can be supported by the network (i.e., the admission of the new PQoS flow will not overtax the bandwidth reserved for PQoS flows), then the NC will admit the requested PQoS flow.

Once a PQoS flow has been admitted, the node from which the flow originates submits "reservation request elements" (RREs) to the NC. The RREs are transmitted to the NC during a scheduled transmission slot allocated in the Media Access Plan (MAP) generated by the NC. The RREs are grouped in a single "reservation request" RR. Each other similarly situated node will also be sending an RR having multiple RREs. The NC checks parameters included in each RRE in making bandwidth allocations (i.e., allocating transmission slot assignments). In one embodiment, parameters of the RRE allow the NC to allocate transmission slot assignments in a manner that better utilizes the reserved PQoS bandwidth and maximizes the network efficiency/capacity.

In one embodiment, all the RREs are classified into following "QoS priority levels": (1) PQoS RRs, (2) PQoS ORRs, (3) Priority High RRs, (4) Priority Medium RRs, (5) Priority Low RRs, (6) Priority Background RRs, (7) Priority High ORRs, (8) Priority Medium ORRs, (9) Priority Low ORRs, and (10) Priority Background ORRs. In addition to this hierarchy, RREs that are requesting a transmission slot for a packet that has reached a maximum aggregation amount move higher up the hierarchy within the same QoS priority level.

PQoS RRs are RREs in which the latency tolerance (e.g., TTL) parameter is not considered. PQoS RRs have a flag set that indicates that the RRE is a PQoS RR.

PQoS ORRs are RREs in which the network guarantees that the packet will be delivered without negatively impacting the quality of the user experience, through network level and node level resources reservation done during the PQoS flow admission process. As such, the latency tolerance and/or maximum aggregation amount is specified for the packet for which the REE is requesting a transmission slot.

Priority RRs are RREs in which the network does not guarantee that the packet will be delivered without negatively impacting the quality of the user experience, because there is a priori no resources reservation through admission process.

However, these RREs have a parameter that indicates a priority relative to the other Priority RRs. Note that, in one embodiment, there are four priority levels that can be indicated, including: (1) high, (2) medium, (3) low and (4) background. Other number of priority levels may be used if needed.

Priority ORRs are RREs in which the network does not guarantee that the packet will be delivered without negatively impacting the quality of the user experience. Nonetheless, the maximum aggregation amount (and optionally the latency tolerance if available) is specified for the packet for which the REE is requesting a transmission slot to assist the NC in setting the relative priority of the request.

In one embodiment the PQoS ORRs include an indication of the latency permitted by the flow's TSpec. One example of a manner in which latency is indicated is a "time-to-live" (TTL) parameter. In another embodiment, the PQoS and Priority ORRs also include an indication as to whether the node has reached its maximum aggregation amount. The maximum aggregation amount indicates whether the associated packet has accumulated as many units of information as can be aggregated together for transmission with a single MoCA packet header.

Accordingly, with such embodiments, the NC has additional information that can be used in making bandwidth allocations. For example, the NC can look at the latency parameter and, if the packet for which the node is requesting a transmission slot can tolerate a higher latency, the NC can determine whether to delay the transmission of the packet associated with that RRE until later. It should be noted that the presently disclosed method and apparatus is disclosed using the example of a MoCA network. However, it will be understood by those skilled in the art that a MoCA network is merely one example of the types of networks in which the method and apparatus exist.

As a further example, in a network, such as MoCA, in which information is communicated in communication windows, such as MAP cycles, assume that a large amount of bandwidth is required by a first admitted flow with a relatively high latency tolerance (i.e., there are a relatively large number of PQoS packets associated with the flow that are ready to be transmitted). Assume further that a several packets of a second admitted flow are also ready for transmission and so the node is requesting a large amount of bandwidth, but with a lower latency tolerance. In this case, the NC can decide to take advantage of the first flow's relatively high latency tolerance by delaying the assignment of transmission slots in the next MAP cycle, and allocate the current bandwidth to the second flow.

Furthermore, in one embodiment of the disclosed method and apparatus, in contrast to a conventional RRE, an ORR element can make a reservation to transmit data that may not be present in the requesting node's data buffer at the time the reservation request is made. However, the data will be placed in the node's data buffer after the ORR is provided to the NC and before the granted transmission interval in the next Media Access Plan (MAP) cycle. In addition, an ORR element can request a transmission slot for data that is already present in the node's data buffer, similar to a conventional reservation request. However, unlike packets associated with a conventional reservation request, the data can be kept in the data buffer for a longer period of time than is permitted with the convention reservation request, if necessary. In other words, the assignment of a transmission slot in response to the ORR can be delayed if the current network utilization is high by taking in to account the latency tolerance.

In one embodiment of the disclosed method and apparatus, delaying the assignment of a transmission slot means that the NC will not respond to the RRE. When the requesting node receives the next MAP and does not see an assignment that corresponds to the request, the node can generate a new RRE for that packet. In one particular case, if the packet has been delayed for nearly the latency tolerance, then the node can generate the new RRE as a conventional PQoS RRE. Doing so will ensure that the packet is provided the highest priority in getting an assignment of a transmission slot. However, in many cases, there will be enough time remaining before the packet must be transmitted to allow the node to generate a new PQoS ORR. The latency tolerance would be updated in the new RRE to indicate that some time has already elapsed.

Allowing the NC to elect not to assign a transmission slot to a PQoS ORR makes it possible to manage the reserved PQoS bandwidth by reducing peaks in the bandwidth required by the sum of all PQoS flows. Doing so means that the bandwidth reserved for PQoS can support more PQoS flows (i.e., more PQoS flows can be admitted). This coordination of the flows allows the NC to more efficiently manage multiple flows that might otherwise require the NC to transmit the peak number of packets at the same time.

The NC scheduler, in one embodiment, uses a bandwidth Cost Function of a PQoS flow to determine whether to admit the PQoS flow. In some embodiments, the Cost Function of a flow is the worst case STAR for the flow. In one such embodiment, the STAR is the number of bytes to be transmitted (or equivalent transmission slots assigned) averaged over the latency tolerance. The latency tolerance is the amount of time that a packet of the flow can be delayed without significantly adversely affecting the quality of the user experience. Therefore, the NC reserves an amount of bandwidth equal to the worst case STAR for the flow. Note that for a given PQoS flow, the STAR is typically significantly smaller than the peak rate because the window length used to measure the STAR is typically significantly larger than that of the peak rate. To avoid buffer overflow in the transmit node and receive node, the buffer size in each node is appropriately sized. Alternatively, the STAR need not be calculated over the latency tolerance, but rather can be calculated as the amount of bytes in a window of a predetermined duration. In that case, the Cost Function would be calculated using both the STAR and the latency tolerance of the flow.

Both a conventional RRE and an ORR element can be identified for both PQoS and non-PQoS flows. In one embodiment, a transmitting node makes a PQoS ORR when at least one packet is ready for transmission, unless either the latency limit or the Maximum Aggregation Efficiency (either the maximum MoCA packet size or the maximum number of sub-packets, such as Ethernet packets) has been reached. If the Maximum aggregation efficiency or the latency tolerance limit has been reached, then in accordance with one embodiment of the disclosed method and apparatus, a conventional reservation request is used. A conventional PQoS reservation request is always granted before a PQoS ORR is granted by the NC. The conventional PQoS reservation requests are granted in the order of their priority, if a priority has been assigned. PQoS ORRs will be granted in order of priority before a prioritized reservation request, assuming that a sufficient amount of the bandwidth reserved for PQoS flows is available. If there is not enough reserved PQoS bandwidth remaining, then the conventional prioritized QoS reservation requests are granted in order of priority. Next, any remaining PQoS ORRs for which there was insufficient reserved PQoS bandwidth are granted. Finally, the Prioritized ORRs are granted in order of priority.

Note that the buffer size needed for a PQoS flow is determined by the peak rate, the STAR, RR to Xmit latency, and maximum MoCA packet size, while the Cost Function of the PQoS flow for the NC scheduler is determined by the STAR and the flow's latency tolerance.

The peak rate (measured with a window size of typically less than one MoCA cycle) of a typical PQoS flow is significantly larger than the STAR (when measured with a window that is the size of latency tolerance, typically ranging from a few milliseconds to tens of milliseconds). In addition, the NC uses the STAR in the cost function calculation of the flow. Accordingly, the amount of bandwidth allocated to PQoS flows (e.g., 80%) is able to accommodate more PQoS flows with the systems and method described herein, than previously possible with prior systems such as, for example, that specified by MoCA 1.1.

Figure 2:
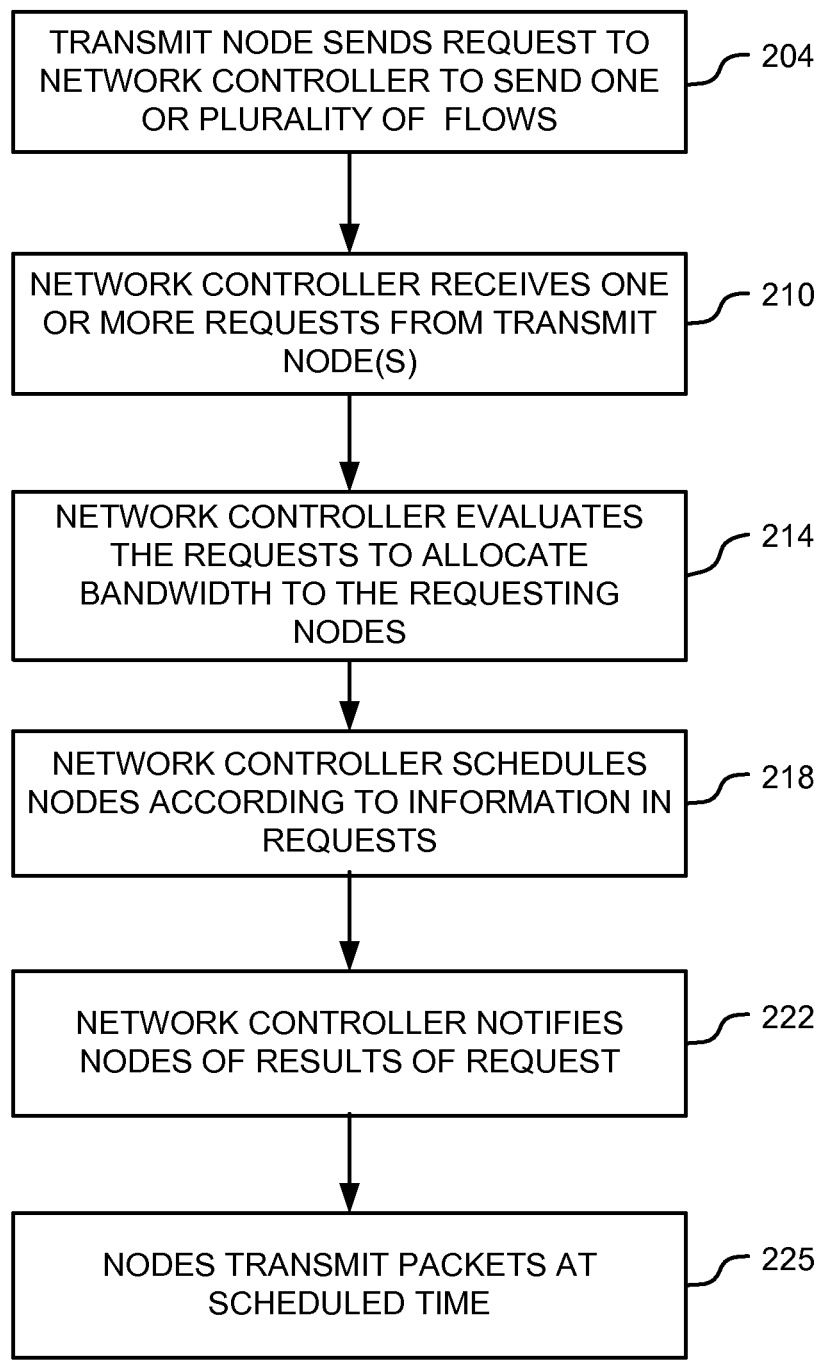
FIG. 2 is a diagram illustrating an example process for scheduling network resources in accordance with one embodiment of the systems and methods described herein.

FIG. 2 is a diagram illustrating an example process for scheduling network resources in accordance with one embodiment of the systems and methods described herein. Referring now to FIG. 2, in a step 204 a node in the network that desires to transmit a flow sends a request (containing one or plurality of reservation request elements) to the network controller indicating it has one or plurality of network packets (belonging to one or plurality of flows) for transmission. Each reservation request element of the request includes information of the QoS priority level (in decreasing priority level: PQoS RR, PQoS ORR, Priority High RR, Priority Medium RR, Priority Low RR, Priority Background RR, Priority High ORR, Priority Medium ORR, Priority Low ORR, Priority Background ORR). Additionally, in some embodiments, the request can include additional information such as, for example, the flows tolerance to latency and whether or not the node has reached its maximum aggregation efficiency, either directly as parameters, or indirectly as appropriate priority level (i.e. PQoS RR vs. PQoS ORR, and Priority N RR vs. Priority N ORR, where PQoS RR and PQoS ORR are both for PQoS flows, but PQoS ORR means that the flow latency has not reached limit and the maximum packet aggregation has not been reached, so that PQoS ORR are scheduled (1) only if there is remaining PQoS bandwidth after all PQoS RRs have been scheduled, or (2) only if there is remaining prioritized bandwidth after all the Priority RRs have been scheduled). In the course of network operations, multiple nodes may send reservation requests such as this to the network controller to request bandwidth reservations for an upcoming communication window or a plurality of communication windows.

At operation 210, the network controller receives these requests from the one or more nodes requesting reservations. At operation 214, the network controller evaluates requests to allocate available bandwidth among one or more of the data flows of all the requesting nodes. Within PQoS flows, PQoS RRs are scheduled first before the PQoS ORRs because PQoS RRs indicate that either the maximum packet aggregation has been reached, or the latency limit has been reached for the corresponding flows. A PQoS flow that has reached its latency limit must be scheduled first in order to avoid these packets becoming stale. A PQoS flow that has reached its maximum aggregation efficiency is inherently more efficient than flows that have not and accordingly, bandwidth can be allocated to that before flows which have not reached latency limit and have not reached maximum aggregation (as indicated through PQoS ORRs).

Likewise, the network controller can compare latency requirements either through the use of the parameter TTL in the PQoS ORR, or through the use of PQoS RR vs PQoS ORR) for the flows requested by a plurality of nodes. In one embodiment, bandwidth may be first allocated to a flow that has the lowest tolerance for latency and remaining bandwidth, if any, is further allocated among one or more remaining flows based on their latency tolerance. If, for example, a given flow has very low latency tolerance, available communication slots will be allocated to that flow before his allocated to other flows that have some higher tolerance for latency.

At operation 218, based on the above evaluation, the network controller allocates bandwidth for data flows of nodes and schedules their communication accordingly. At operation 222, the network notifies the nodes of their reservations. At operation 225, the nodes receive grants to their reservations and transmit packets at scheduled times accordingly.

As noted above, a flexible reservation request or opportunistic reservation request can be generated to include the additional information described above with reference to FIG. 2 that enables the network controller to make a more informed decision when performing network allocation. Particularly, in the example described above with reference to FIG. 2, a few additional types of information are provided in the flexible reservation request: the field FRAME SUBTYPE indicates if this reservation request element is an Opportunistic Reservation Request Element (ORR); the field PARAMETERS indicates if the maximum packet aggregation is reached and the Time-to-Live (TTL) value of the PQoS packets in this reservation request element; the filed PRIORITY_DFID indicates the priority level of the reservation request element (PQoS, Priority High, Priority Medium, Priority Low, and Priority Background). Table 1 is a diagram illustrating an example of a flexible reservation request (including opportunistic reservation request) in accordance with one embodiment of the systems and methods described herein.

TABLE 1

| Field | Length | Usage |
| --- | --- | --- |
| FRAME_SUBTYPE | 4 bits | If FRAME_TYPE = Link Control (0x2) |
| | | 0x0 - Type I/III Probe Report |
| | | 0x1 - Reserved Type II |
| | | 0x2 - Reserved Type II |
| | | 0x3 - Key distribution |
| | | 0x4 - Dynamic Key distribution |
| | | 0x5 - Type I/III Probe Report Request |
| | | 0x6 - Link Acknowledgement |
| | | 0x7 - Reserved Type II |
| | | 0x8 - Periodic Link Packet |
| | | 0x9 - Power Control |
| | | 0xA - Power Control Response |
| | | 0xB - Power Control Acknowledgement |
| | | 0xC - Power Control Update |
| | | 0xD - Topology update |

TABLE 1-continued

| Field | Length | Usage |
|---|---|---|
| | | 0xE - Unicast MAC Address Notification |
| | | 0xF - Reserved Type II |
| | | If FRAME_TYPE = Ethernet Transmission |
| | | 0x0 = ETHERNET_PACKET for A-PDU not belonging to a unicast PQoS Flow with a usable DFID |
| | | 0x1 = Opportunistic reservation request for A-PDU not belonging to a unicast PQoS Flow with a usable DFID |
| | | 0x2 = ETHERNET_PACKET for A-PDU belonging to a unicast PQoS Flow with a usable DFID |
| | | 0x3 = Opportunistic reservation request for A-PDU belonging to a unicast PQoS Flow with a usable DFID |
| | | If FRAME_TYPE = Link Control II (0x9) |
| | | 0x3 - Receiver-Determined Probe Request |
| FRAME_TYPE | 4 bits | 0x2 = Link Control |
| | | 0x3 = Ethernet Transmission |
| | | 0x9 = Link Control II |
| DESTINATION | 8 bits | For unicast: Node ID of the destination node |
| | | For multicast: Destination Flow ID of the multicast flow if assigned, otherwise 0x3F. |
| | | For broadcast: 0x3F |
| PHY_PROFILE | 8 bits | Indicates the type of modulation scheme used for this transmission |
| | | bits 7:6 |
| | | 00 = profile sequence 0 |
| | | 01 = profile sequence 1 |
| | | bits 5:0 |
| | | 0x02 = Diversity Mode profile |
| | | 0x07 = Unicast profile |
| | | 0x08 = Broadcast profile |
| | | 0x0D = Unicast profile in MoCA 2.0 PHY |
| | | 0x0E = Broadcast (BBL) profile in MoCA 2.0 PHY |
| | | 0x10 = VLPER Unicast profile in MoCA 2.0 PHY. |
| | | 0x11 = VLPER Broadcast profile in MoCA 2.0 PHY. |
| | | 0x12 = Unicast profile in channel bonding |
| | | 0x14 = VLPER Unicast profile in channel bonding |
| | | 0x15 = Diversity Mode profile in MoCA 2.0 100 MHz channel |
| | | 0x16 = Diversity Mode profile in secondary channel of a bonded link |
| | | All other values reserved. |
| | | Bits 5:0 SHOULD be ignored if FRAME_TYPE = Control II (0x9) and FRAME_SUBTYPE = 0x3. |
| REQUEST_ID | 8 bits | A sequence number associated with the request. |
| PARAMETERS | 121 bits | If FRAME_TYPE = Ethernet Transmission and FRAME_SUBTYPE = 0x0 |
| | | Bit 11 - Reserved |
| | | Bits 10:0 - |
| | | Total data size of the FEC padding bytes in the last symbol. Combined with the DURATION field, this field is used to calculate the total MPDU size which cannot exceed $S_a$, by NC. |
| | | If FRAME_TYPE = Ethernet Transmission and FRAME_SUBTYPE = 0x1 and PRIORITY = 0x3 |
| | | Bits 101:7 - Reserved |
| | | Bit 6 - Maximum aggregation flag |
| | | 0: the A-PDU has NOT reached either maximum aggregation size or maximum aggregation packet number |
| | | 1: the A-PDU has reached either maximum aggregation size or maximum aggregation packet number |
| | | Bits 5:0 - The smallest Time to Live (TTL) value of PQoS packets in the A-PDU |
| | | Else |
| | | Bits 101:0 - Reserved. |

TABLE 1-continued

| Field | Length | Usage |
|---|---|---|
| HIGH_BIT | 1 bit | If FRAME_TYPE = Ethernet Transmission and FRAME_SUBTYPE = 0x2 or 0x3: High bit of DFID Else Reserved Type III |
| PRIORITY_DFID | 4 bits | If FRAME_TYPE = Control 0x0 If FRAME_TYPE = Ethernet Transmission and FRAME_SUBTYPE = 0x0 or 0x1: 0x0 - Low Priority 0x1 - Medium Priority 0x2 - High Priority 0x3 - PQoS Priority 0x4 - Background Priority If FRAME_TYPE = Ethernet Transmission and FRAME_SUBTYPE = 0x2 or 0x3: LS bits of DFID of the unicast PQoS Flow (DFID = 16*HIGH_BIT + PRIORITY) |
| DURATION | 16 bits | Transmission time required in multiples of SLOT_TIMEs |

Figure 3:
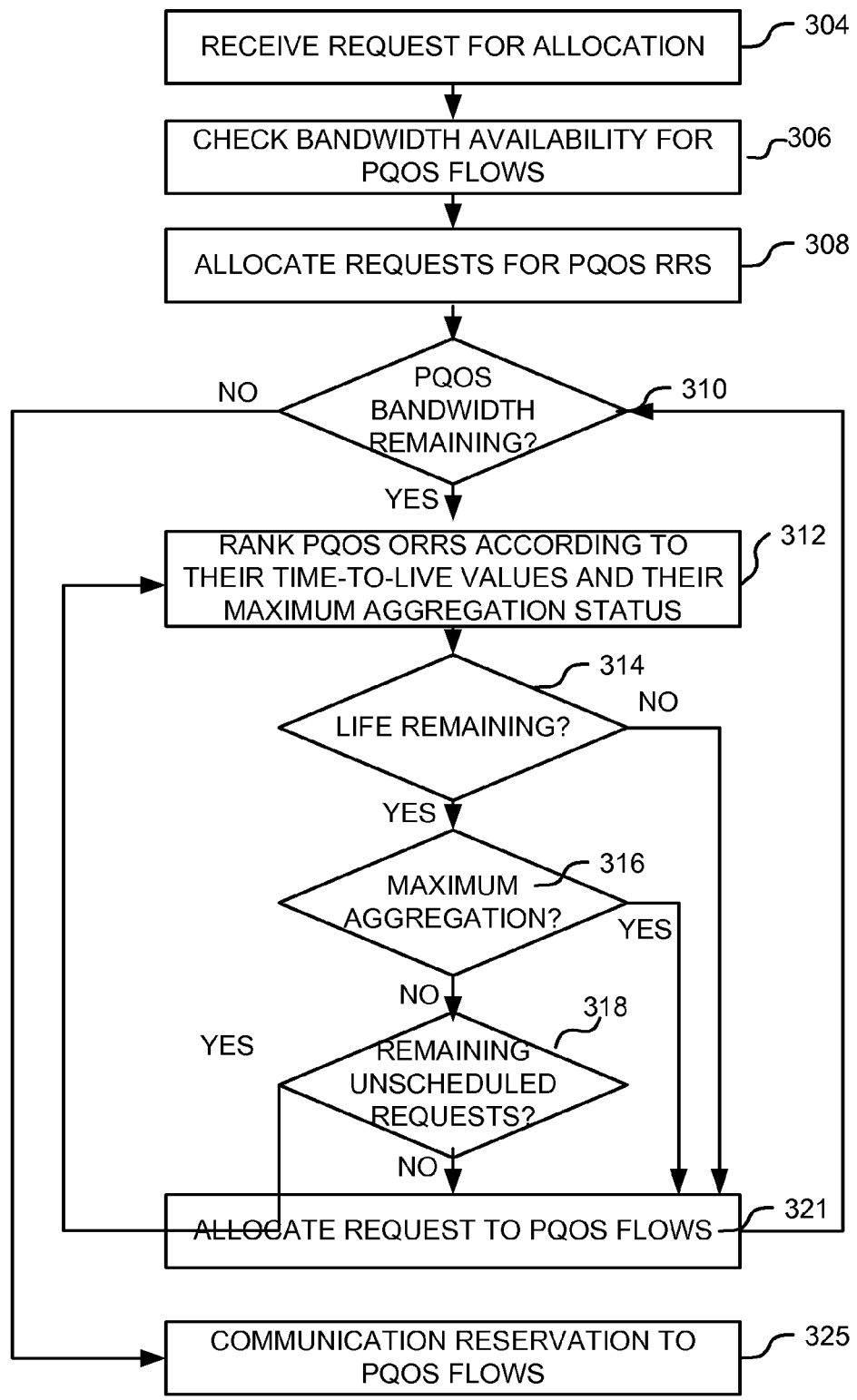
FIG. 3 is a diagram illustrating an example process for allocating network resources among a plurality of nodes making reservations using an opportunistic Reservation Request in accordance with one embodiment of the systems and methods described herein.

FIG. 3 is a diagram illustrating an example process for allocating network resources among a plurality of nodes making reservations for plurality of PQoS flows using a flexible reservation request in accordance with one embodiment of the systems and methods described herein. Referring now to FIG. 3, at operation 304 the network controller receives one or more requests for bandwidth reservation. In this example, it is assumed that the network controller receives one or more flexible reservation requests for plurality of PQoS flows from one or more transmit nodes. At operation 306, the network controller checks the availability of the PQoS bandwidth for the window or period being scheduled.

At operation 308, the network controller allocates bandwidth for PQoS RRs first until all the PQoS RRs are allocated, or the PQoS bandwidth is fully allocated, which ever comes first. At operation 310, the network controller checks if there is remaining PQoS bandwidth. If yes, at operation 312, the network controller ranks all the PQoS ORRs according to their latency and their maximum aggregation status. At operation 314, for a given PQoS ORR, the network controller checks the latency parameter, a time-to-live parameter in one embodiment, to determine whether the flow being scheduled by the node can tolerate any latency. In one embodiment, the latency parameter is effectively a binary representation of whether or not to flow can tolerate latency. In other embodiments, the latency parameter can indicate the amount of latency or delay a flow can tolerate. The simple example illustrated in FIG. 3 is described in terms of the former, wherein the latency parameter is a binary or yes/no indicator.

At operation 314, if the flow can not tolerate any latency, the reservation is given to that node as illustrated by operation 321. If, on the other hand, the flow can tolerate latency but if it has reached maximum aggregation as illustrated in operation 316, it is scheduled as indicated by operation 321. If the flow can tolerate latency and if it has not reached maximum aggregation, and if there are additional flows pending, the latency of those flows and their maximum aggregation status are checked before allocating the resources to the first flow. This is illustrated by operations 318 and 312. In one embodiment, this iterative process continues until a flow with no latency tolerance is encountered so that the resources are allocated to that zero-latency flow. The order in which the latency of PQoS flows can be checked can be in accordance with a variety of criteria such as, for example, the device class or type, quality of service requirements, and so on. In embodiments where latency is defined with more granularity, a plurality of flows can be ranked according to their relative latency tolerance.

If there are additional PQoS flows with requests pending, the process can be repeated for each of these nodes until all the notes have been allocated bandwidth or there is no longer sufficient availability to service the flows. At operation 325, the allocation is communicated to the requesting node or nodes.

If multiple transmit nodes have accumulated the maximum packet size or more when the reservation request is made, the network controller may not have sufficient bandwidth available to schedule all the data of all the nodes while still meeting the latency constraints of each node. Accordingly, in one embodiment, a transmit node is configured to make an opportunistic reservation request if it has data to send but the data's latency limit has not been reached, and the Maximum Aggregation Efficiency has not been reached. An opportunistic reservation request will be granted by the network controller if there is available network bandwidth. This means that if there is available network bandwidth, it will be used to transmit PQoS flow packets to reduce the packet accumulation in the transmit nodes. A transmit node will make an RR if it has data to send and if either the data's latency limit has been reached or the Maximum Aggregation Efficiency has been reached. The reservation requests and the corresponding grants before the Latency limit reduce the buffer size requirement.

Figure 4:
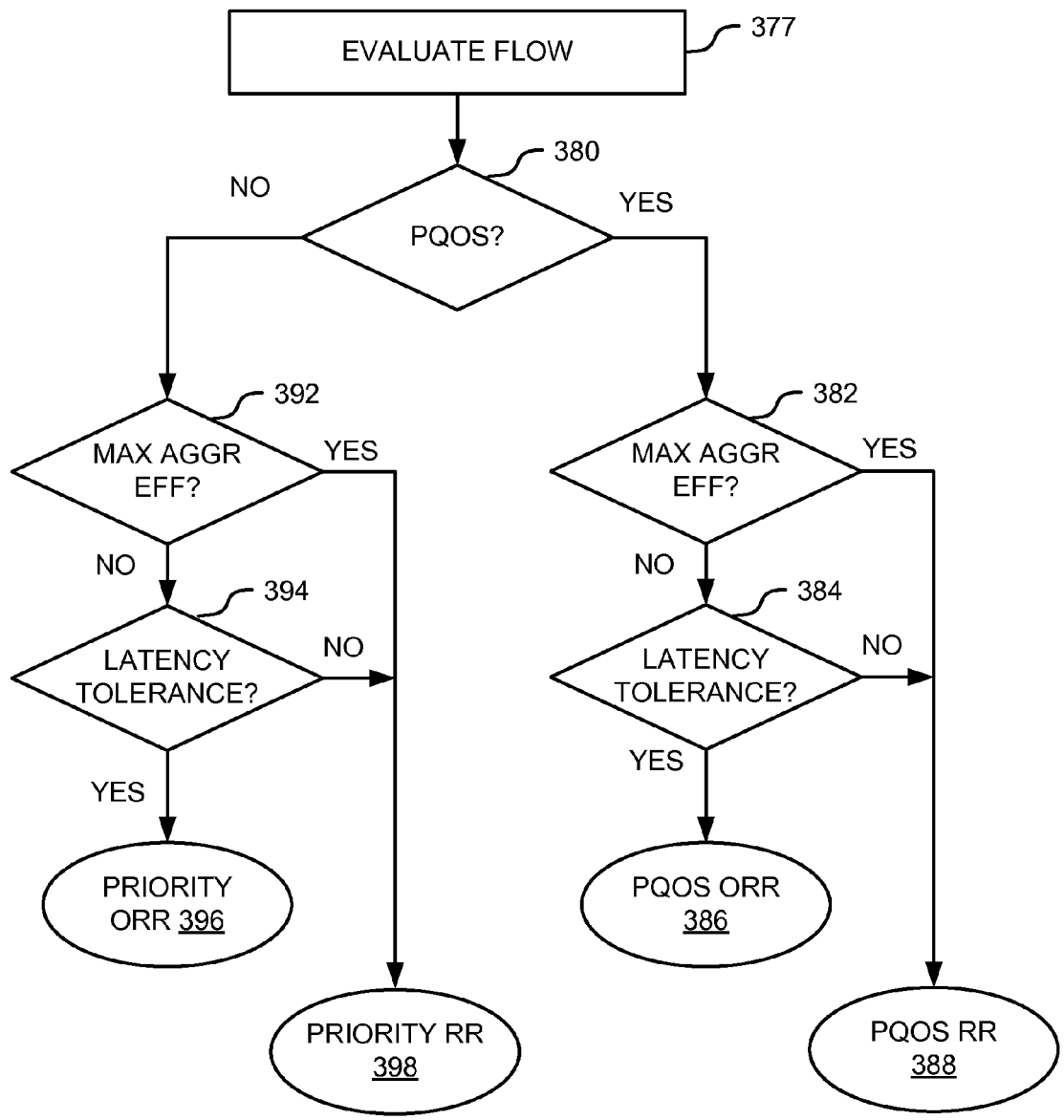
FIG. 4 is a diagram illustrating an example process for determining a reservation request type in accordance with one embodiment of the systems and methods described herein.

FIG. 4 is a diagram illustrating an example process for determining a reservation request type in accordance with one embodiment of the systems and methods described herein. This example assumes a network type such as that specified by the MoCA specification utilizing parameterized quality of service (PQoS) flows. Referring now to FIG. 4, at operation 377, a requesting node evaluates its flows.

In accordance with one embodiment, when a transmit node wishes to transmit information within a PQoS flow, the node makes a reservation request of PQoS priority level to the network controller. The reservation request may be PQoS RR or PQoS ORR. The PQoS ORR 386 allows the node to indicate that it has not reached the Maximum Aggregation Efficiency (in terms of the maximum MoCA packet size and the maximum number of Ethernet packets) and it can afford to wait for some time before the flow's latency parameter is violated. This is illustrated by operations 380, 382, 384 and 386. In one embodiment, the amount of time the node can wait without violating the latency parameter is defined by the variable "TTL" provided in the PQoS ORR 386. The TTL can be binary or can have a greater level of resolution or granularity. In one embodiment, the value of the TTL indicates the amount of time in milliseconds.

The network controller grants the node's PQoS ORR 386 if there are a sufficient number of free transmission slots for PQoS flows. In one embodiment, if the network controller receives multiple PQoS ORRs 386 having different TTL values, the network controller schedules the PQoS ORR 386 with the smallest TTL first before scheduling the other nodes. The remaining nodes can likewise be scheduled in this order based on smallest to largest TTL values. In one embodiment, the TTL has a range from 1 to (Latency-1) ms. For simplicity, the TTL may be omitted (or set to a reserved value of 1), to indicate that the packets associated with this PQoS ORR 386 can be delayed for an undetermined time without violating the Latency requirement.

In another embodiment, in addition to or in place of the PQoS ORR 386 request described above, a transmit node that has data to send in a PQoS flow can use a PQoS RR 388 to indicate to the network controller that it has PQoS flow data to send. The node uses the PQoS RR 388 rather than the PQoS ORR 386 because it either has reached the Maximum Aggregation Efficiency (i.e., either the maximum MoCA packet size or the maximum number of packets) at operation 382, or the node cannot afford to wait without violating the flow's latency requirement (operation 384). For each MoCA cycle, the network controller in one embodiment first schedules all the PQoS RR 388 before all other reservation requests, including PQoS ORR 386 and non-PQoS reservation requests (i.e., Priority ORRs 396 and Priority RRs 398).

In accordance with one embodiment of the disclosed method and apparatus, one particular type of reservation request is a Priority ORR 396 used by a transmitting node for Prioritized flows (operation 380). Priority ORR 396 is used to indicate to the network controller that the transmitting node has prioritized data to send, but it has not reached the Maximum Aggregation Efficiency (operation 392) and the node can afford to wait for some amount of time before a latency requirement (if any) would be violated (operation 394). The network controller grants the request element if there are transmission slots available.

In accordance with another embodiment of the disclosed method and apparatus, a Priority RR 398 is another request used by a transmitting node for flows that are not PQoS flows (operation 380). The Priority RR 398 is used by a transmitting node to indicate to the network controller that it has prioritized data to send, and it either has reached the Maximum Aggregation Efficiency (operation 392) or the node cannot afford to wait (operation 394) (e.g. the node has an urgent message). In one embodiment, the network controller grants the Priority RR 398 before any Priority ORR 396 of the same QoS priority level is granted.

The various requests can be prioritized for scheduling purpose, and in one embodiment, the network controller schedules reservation request elements according to the order of decreasing priority listed in Table 2. Four levels of priority are shown in this example for non-PQoS flows (i.e. Prioritized QoS flows).

TABLE 2

PQoS RR
PQoS ORR(TTL) if there is remaining PQoS bandwidth

TABLE 2-continued

Priority High RR
Priority Medium RR
Priority Low RR
Priority Background RR
PQoS ORR(TTL) when there is no remaining PQoS bandwidth, but there is still prioritized bandwidth
Priority High ORR
Priority Medium ORR
Priority Low ORR
Priority Background ORR In one embodiment, if the network controller receives more than one PQoS RR 388, then the network controller grants the requests of the PQoS RRs 388 using a round-robin selection process. If there is remaining PQoS bandwidth after all of the PQoS RRs 388 have been granted and more than one PQoS ORR 386 is received by the network controller, the network controller first grants the request to the PQoS ORR 386 with the smallest TTL value. If more than one PQoS ORR 386 have the same TTL value, then a round-robin selection process is used in one embodiment to determine to which PQoS ORR 386 from among those PQoS ORRs 386 with the same TTL value the network controller will grant the next request.

In one embodiment, all the transmit nodes and the network controller coordinate to achieve both QoS for all classes of traffic and maximization of network bandwidth efficiency, by following rules defined below:

Transmit Node: Request Element Sequence Rules

Each transmit node creates reservation elements (REs) for all Ethernet packets and sends the REs to the network controller (NC) in its Reservation Request message(s) every MAP cycle.

Levels of Priority Order are Defined as Follows:
PQoS
High Priority
Medium Priority
Low Priority
Background Priority.

All of the following rules are applied to construction of Reservation
Request(s) for any given MAP cycle:
1. For each flow (same MoCA destination, and same Level of Priority Order), Ethernet packets arrive sequentially at a transmit (ingress) node's Ethernet Convergence Layer (ECL). The ingress node aggregates one or more contiguously sequential packets for the flow and creates an RE for the aggregated packet. When creating an RE for a flow, the ingress node may also include in that RE:
   a. Any Ethernet packet(s) to be retransmitted for the same flow. The retransmitted Ethernet packet may be included anywhere in any aggregated packet without regard for arrival time of the retransmitted packet;
   b. Transmission time requests for Ethernet packets which have not yet arrived at its ECL that belong to a Low-Latency PQoS Flow.
2. The ingress node creates REs for control packets and/or probes it wants to send.
3. All REs created by the ingress node must be either of RR RE type or ORR RE type.
4. REs should be included in the Reservation Request(s) according to the following rules:
   a. REs should be arranged and sent in the order specified in the following list where Control REs are sent first:
      1. Control REs (including Probe requests)
      2. PQoS RR elements
      3. PQoS ORR elements 4. Prioritized RR elements:
   a. High Priority
   b. Medium Priority
   c. Low Priority
   d. Background Priority
5. Prioritized ORR elements:
   a. High Priority
   b. Medium Priority
   c. Low Priority
   d. Background Priority b. REs for the same flow must be sent in order such that REs for Ethernet packets that arrived earlier at the ECL are sent before REs for Ethernet packets that arrived later. Ethernet packets which are retransmitted are exempt from this rule. Retransmitted Ethernet packets may be sent in any RE for the same flow.

c. Two REs must not be sent which include the same Ethernet packet.

Network Controller (NC) Scheduling Rules

The NC scheduling rules includes two parts. The Inclusion Rules describe how the NC selects which request elements are to be scheduled within the MAP cycle, and the Grant Sequence Rules describe the order in which those selected request elements are granted within the MAP cycle.

Inclusion Rules

Upon reception of the RR and ORR elements from all requesting nodes, the NC selects Data request elements to be scheduled within the MAP cycle according to the following Levels of Inclusion Order:

1. PQoS RR elements;
2. PQoS ORR elements are selected at this Level of Inclusion Order as long as the total granted PQoS bandwidth is less than a predefined amount of the next MAP cycle's available data bandwidth. The MAP cycle's available data bandwidth is defined as the sum of the durations in the MAP cycle available for data MPDU transmission including preamble and IFG of each data MPDU transmission (i.e., not counting time for control packets and Probes);
3. Prioritized RR elements:
   a. High Priority;
   b. Medium Priority;
   c. Low Priority;
   d. Background Priority;
4. PQoS ORR elements (i.e., any unselected elements remaining after selections at Level 2);
5. Prioritized ORR elements:
   a. High Priority;
   b. Medium Priority;
   c. Low Priority;
   d. Background Priority.

When selecting request elements to be scheduled within the MAP cycle, the NC must exhaust all request elements at a given Level of Inclusion Order from all requesting nodes before proceeding to select any request elements from the next lower Level of Inclusion Order. Within any given Level of Inclusion Order, the NC must select request elements from any given transmitting node in the same sequence that those request elements were arranged in the respective Reservation Request. The NC's selection from among request elements of the same Level of Inclusion Order, but from different source nodes, is typically round-robin.

Grant Sequence Rules

For all request elements of a given Level of Priority Order, the NC's MAP message must grant DAUs to each transmitting node in the same sequence in which the request elements were arranged in the Reservation Request from that node.

The NC should schedule grants for Low-Latency PQoS Flows early in the MAP cycle.

Packet aggregation is used to increase the efficiency of the Media Access Control (MAC) layer. In the industry standard known as MoCA 1.1, opportunistic packet aggregation is used, i.e. when a transmitting node within the MoCA network is given the opportunity to make a reservation request, the transmitting node checks the number of packets available for transmission (i.e., the number of packets in its transmit buffer), and aggregates (combines the packets) as much as possible prior to transmission. The Aggregated packets are associated with an "AggregationID" which is typically a combination of the destination node and the priority of the packets being aggregated. Aggregation is done more or less efficiently depending on the time distribution of packets.

For an SD flow of 4 Mb/s from a digital video recorder (DVR) to a set top box (STB), with a packet size of 1.5 kB, on average there is only one packet of 1.5 kB for every 3 ms. For a high definition (HD) flow of 20 Mb/s, there are on average 2.5 kB data per ms, or equivalently 5 packets of 1.5 kB for every 3 ms. This example illustrates how packet aggregation can be more effective if done over a longer time interval. The longer time interval means a larger latency for the traffic. For non-PQoS traffic, the traffic latency requirement is often not defined. For PQoS flows, there is typically a well-defined latency requirement. The longer time interval also reduces the peak rate of a PQoS flow, so that more flows can be admitted into the PQoS bandwidth (which is up to 80% of the total network bandwidth). The inclusion of the latency parameter can therefore help the layer-2 maximize the packet aggregation efficiency.

Different applications typically have different latency requirements and bandwidth guarantees. Many latency-sensitive applications need only a small bandwidth, while many applications that require a large bandwidth are less sensitive to latency. For example, interactive gaming and Voice over Internet Protocol (VoIP) are more sensitive to latency than a stream of video playback data from a DVR. This latency/bandwidth distribution enables more effective packet aggregation over the disclosed network because packets will typically be more likely to be aggregated for large bandwidth applications in which the latency requirements are not as strict as they may be for applications that require less bandwidth and lower latency.

In one embodiment in a MoCA application, at the admission time of a PQoS flow, the parameter Latency and STAverageRate are included in the Traffic Specification (TSpec) (provided by the source), and used by relevant nodes to reserve appropriate buffer space, and to enable the nodes to do effective packet aggregation. The Latency parameter indicates the required latency upper-bound from the MoCA ingress node/bridge to MoCA egress node/bridge.

The MoCA ingress node continues to accumulate more packets until the Maximum Aggregation Efficiency is reached (either the maximum MoCA packet size is reached, or the maximum number of packets is reached, whichever comes first), or the latency limit is reached, before it makes the urgent (i.e. regular) reservation request to the network controller. This allows the ingress node the opportunity to achieve the maximum aggregation efficiency. The ingress node can make opportunistic reservation request if the maximum aggregation efficiency has not been reached, and if the latency limit has not been reached, so that if the network is not crowded, these requests will be granted by the network controller.

Figure 5:
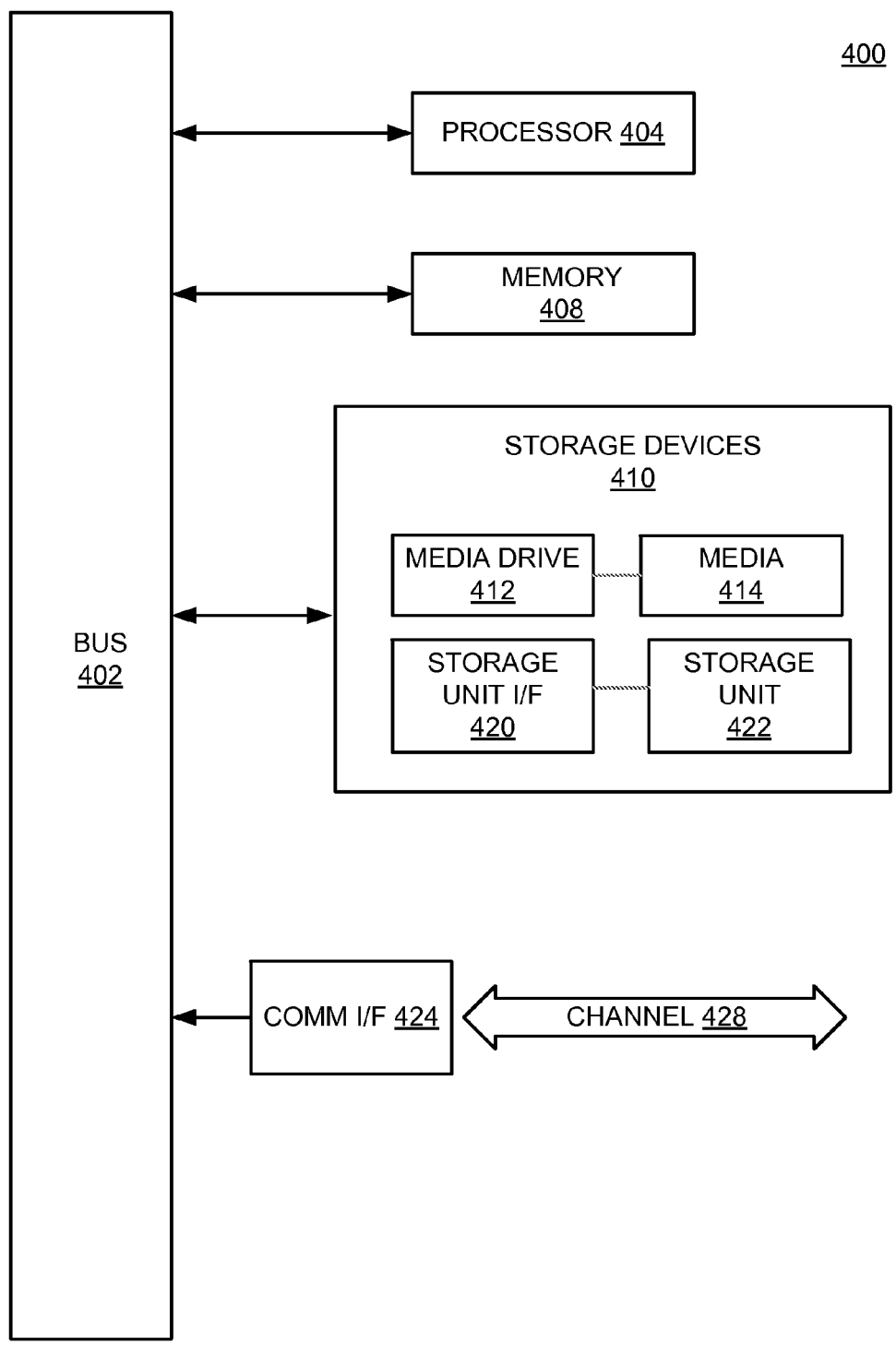
FIG. 5 is a diagram illustrating an example computing module that may be used in implementing various features of embodiments of the disclosed method and apparatus.

As used herein, the term module might describe a given unit of functionality that can be performed in accordance with one or more embodiments of the disclosed method and apparatus. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed method and apparatus are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 400. After reading this description, it will become apparent to a person skilled in the relevant art how to implement the disclosed method and apparatus using other computing modules or architectures.

Referring now to FIG. 5, computing module 400 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module 400 might be found in electronic devices such as, for example, digital cameras, navigation systems, cellular telephones, portable computing devices, modems, routers, wireless access points (WAPs), terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 408, storage unit 420, and media 414. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the disclosed method and apparatus as discussed herein. While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments which are presented as mere examples for illustration only.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for scheduling network communications in a managed network having a Network Coordinator and a plurality of associated network nodes, the method comprising:
  a) allocating a predetermined amount of bandwidth to parameterized quality of service (PQoS) requests;
  b) receiving in the Network Coordinator a plurality of PQoS requests from at least one of the plurality of associated network nodes requesting assignment of a transmission slot in a communication window, at least some of the requests including a latency tolerance parameter indicating the amount of delay that can be tolerated before a transmission slot must be assigned; and
  c) assigning transmission slots in response to each request if there is sufficient bandwidth reserved for PQoS requests to allow all of the received PQoS requests to be assigned a transmission slot and otherwise assigning slots in accordance with a hierarchy in which those PQoS requests that do not include a latency parameter are assigned slots first; wherein at least one of the requests that include a latency tolerance parameter also include a maximum aggregation amount parameter to indicate when the maximum aggregation amount has been reached and assigning transmission slots to the requests that have reached the maximum aggregation amount.

2. The method of claim 1, wherein if all of the PQoS requests that do not include a latency parameter are assigned a slot, those PQoS requests that have a shorter latency tolerance are assigned transmission slots before those PQoS requests that have a longer latency tolerance.

3. A system, comprising:
  a plurality of requesting nodes on a communications network, the requesting nodes each comprising a first processor and a first computer executable program code embodied on a first computer readable medium, the first computer executable program code configured to generate a submission to a Network Coordinator on the network to request a reservation of communication bandwidth; and
  the Network Coordinator on the communications network, the Network Coordinator comprising a second processor and a second computer executable program code embodied on a second computer readable medium, the second executable program code configured to cause the Network Coordinator to perform the operations of:
  a) receiving a submission from each of a plurality of network nodes requesting, for their respective flows, reservation of one or more communication slots in a communication window, the submission including scheduling information comprising at least one of latency tolerance of the flow of its respective requesting network node and whether the requesting network node has reached its maximum aggregation amount;
  b) checking available bandwidth in the communication window;
  c) allocating the available bandwidth to a first flow from a first requesting node based on the first flow's scheduling information and the bandwidth availability, and deferring allocation of bandwidth to a second flow from a second requesting node until a later window based on the second flow's scheduling information and the bandwidth availability, thereby reallocating peak demand among the plurality of requesting nodes across a plurality of communication windows, wherein the allocating comprises determining whether the first requesting node has reached its maximum aggregation amount and it so allocation available communication slots for the first flow; and d) communicating reservation information to the plurality of requesting network nodes.

4. The system of claim 3, wherein the allocating comprises the Network Coordinator determining whether any of the flows can tolerate latency and if so, deferring allocation of communication slots to a later communication window for flows that can tolerate latency.

5. The system of claim 3, wherein the allocating comprises the Network Coordinator evaluating the scheduling information for a given requesting node, and if the given requesting node has reached its maximum aggregation efficiency or has no latency tolerance, allocating the available communication slots to the given requesting node.

6. The system of claim 3, wherein the allocating further comprises deferring the allocating the available communication slots to the given requesting node if the given requesting node has not reached its maximum aggregation efficiency and has latency tolerance.

7. The system of claim 6, wherein if allocation to the given requesting node is deferred, the allocating further comprises examining the scheduling information of a next requesting node and if the next requesting node has reached its maximum aggregation efficiency or has no latency tolerance, allocating the available communication slots to the next requesting node; and if the next requesting node has not reached its maximum aggregation efficiency and has latency tolerance, allocating the available communication slots, then examining scheduling information for another requesting node or allocating the available communication slots to the given requesting node if there is not another requesting node.

8. The system of claim 3, wherein the operations performed by the Network Coordinator further comprise evaluating the scheduling information for each of the requesting nodes in an order of priority, from a highest priority requesting node to a lowest priority requesting node.

9. The system of claim 3, wherein the latency tolerance information comprises a binary representation as to whether or not a flow can tolerate any latency.

10. The system of claim 3, wherein the latency tolerance information comprises information regarding an amount of latency a flow can tolerate.

11. The system of claim 3, wherein the operations performed by the Network Coordinator further comprise determining whether each of the plurality of requesting nodes is making a conventional reservation request or an opportunistic reservation request.

12. The system of claim 3, wherein the operations performed by the Network Coordinator further comprise allocating the available communication slots to requesting nodes making a conventional reservation request before allocating any remaining available communication slots to other requesting nodes based on the other requesting nodes' respective flow scheduling information and the bandwidth availability.

13. A method for scheduling network communications in a managed network having a Network Coordinator and a plurality of associated network nodes, the method comprising:

a) receiving in the Network Coordinator a submission from each of a plurality of network nodes requesting, for their respective flows, reservation of one or more communication slots in a communication window, the submission including scheduling information comprising at least one of latency tolerance of the flow of its respective requesting network node and whether the requesting network node has reached its maximum aggregation amount;

b) the Network Coordinator checking available bandwidth in the communication window;

c) the Network Coordinator allocating the available bandwidth to a first flow from a first requesting node based on the first flow's scheduling information and the bandwidth availability, and deferring allocation of bandwidth to a second flow from a second requesting node until a later window based on the second flow's scheduling information and the bandwidth availability, thereby reallocating peak demand among the plurality of requesting nodes across a plurality of communication windows; and d) the Network Coordinator communicating reservation information to the plurality of requesting network nodes;

wherein the allocating comprises the Network Coordinator evaluating the scheduling information for a given requesting node, and if the given requesting node has reached its maximum aggregation efficiency or has no latency tolerance, allocating the available communication slots to the given requesting node.

14. The method of claim 13, wherein the allocating comprises the Network Coordinator determining whether any of the flows can tolerate latency and if so, deferring allocation of communication slots to a later communication window for flows that can tolerate latency.

15. The method of claim 13, wherein the allocating further comprises deferring the allocating the available communication slots to the given requesting node if the given requesting node has not reached its maximum aggregation efficiency and has latency tolerance.

16. The method of claim 15, wherein if allocation to the given requesting node is deferred, the allocating further comprises examining the scheduling information of a next requesting node and if the next requesting node has reached its maximum aggregation efficiency or has no latency tolerance, allocating the available communication slots to the next requesting node; and if the next requesting node has not reached its maximum aggregation efficiency and has latency tolerance, allocating the available communication slots, then examining scheduling information for another requesting node or allocating the available communication slots to the given requesting node if there is not another requesting node.

17. The method of claim 13, wherein the operations performed by the Network Coordinator further comprise evaluating the scheduling information for each of the requesting nodes in an order of priority, from a highest priority requesting node to a lowest priority requesting node.

18. The method of claim 13, wherein the latency tolerance information comprises a binary representation as to whether or not a flow can tolerate any latency.

19. The method of claim 13, wherein the latency tolerance information comprises information regarding an amount of latency a flow can tolerate.

20. The method of claim 13, wherein the operations performed by the Network Coordinator further comprise determining whether each of the plurality of requesting nodes is making a conventional reservation request or an opportunistic reservation request.

21. The method of claim 13, wherein the operations performed by the Network Coordinator further comprise allocating the available communication slots to requesting nodes making a conventional reservation request before allocating any remaining available communication slots to other requesting nodes based on the other requesting nodes' respective flow scheduling information and the bandwidth availability.

22. A method for scheduling network communications in a managed network having a Network Coordinator and a plurality of associated network nodes, the method comprising:
   a) receiving in the Network Coordinator a submission from each of a plurality of network nodes requesting, for their respective flows, reservation of one or more communication slots in a communication window, the submission including scheduling information comprising at least one of latency tolerance of the flow of its respective requesting network node and whether the requesting network node has reached its maximum aggregation amount;
   b) the Network Coordinator checking available bandwidth in the communication window;
   c) the Network Coordinator allocating the available bandwidth to a first flow from a first requesting node based on the first flow's scheduling information and the bandwidth availability, and deferring allocation of bandwidth to a second flow from a second requesting node until a later window based on the second flow's scheduling information and the bandwidth availability, thereby reallocating peak demand among the plurality of requesting nodes across a plurality of communication windows; and
   d) the Network Coordinator communicating reservation information to the plurality of requesting network nodes;
   wherein the allocating further comprises deferring the allocating the available communication slots to the given requesting node if the given requesting node has not reached its maximum aggregation efficiency and has latency tolerance.

23. The method of claim 22, wherein the allocating comprises the Network Coordinator determining whether any of the flows can tolerate latency and if so, deferring allocation of communication slots to a later communication window for flows that can tolerate latency.

24. The method of claim 22, wherein if allocation to the given requesting node is deferred, the allocating further comprises examining the scheduling information of a next requesting node and if the next requesting node has reached its maximum aggregation efficiency or has no latency tolerance, allocating the available communication slots to the next requesting node; and if the next requesting node has not reached its maximum aggregation efficiency and has latency tolerance, allocating the available communication slots, then examining scheduling information for another requesting node or allocating the available communication slots to the given requesting node if there is not another requesting node.

25. The method of claim 22, wherein the operations performed by the Network Coordinator further comprise evaluating the scheduling information for each of the requesting nodes in an order of priority, from a highest priority requesting node to a lowest priority requesting node.

26. The method of claim 22, wherein the latency tolerance information comprises a binary representation as to whether or not a flow can tolerate any latency.

27. The method of claim 22, wherein the latency tolerance information comprises information regarding an amount of latency a flow can tolerate.

28. The method of claim 22, wherein the operations performed by the Network Coordinator further comprise determining whether each of the plurality of requesting nodes is making a conventional reservation request or an opportunistic reservation request.

29. The method of claim 22, wherein the operations performed by the Network Coordinator further comprise allocating the available communication slots to requesting nodes making a conventional reservation request before allocating any remaining available communication slots to other requesting nodes based on the other requesting nodes' respective flow scheduling information and the bandwidth availability.

30. A method for scheduling network communications in a managed network having a Network Coordinator and a plurality of associated network nodes, the method comprising:
   a) receiving in the Network Coordinator a submission from each of a plurality of network nodes requesting, for their respective flows, reservation of one or more communication slots in a communication window, the submission including scheduling information comprising at least one of latency tolerance of the flow of its respective requesting network node and whether the requesting network, node has reached its maximum aggregation amount;
   b) the Network Coordinator checking available bandwidth in the communication window;
   c) the Network Coordinator allocating the available bandwidth to a first flow from a first requesting node based on the first flow's scheduling information and the bandwidth availability, and deferring allocation of bandwidth to a second flow from a second requesting node until a later window based on the second flow's scheduling information and the bandwidth availability, thereby reallocating peak demand among the plurality of requesting nodes across a plurality of communication windows; and
   d) the Network Coordinator communicating reservation information to the plurality of requesting network nodes;
   wherein the allocating further comprises deferring the allocating the available communication slots to the given requesting node if the given requesting node has not reached its maximum aggregation efficiency and has latency tolerance, and wherein if allocation to the given requesting node is deferred, the allocating further comprises examining the scheduling information of a next requesting node and if the next requesting node has reached its maximum aggregation efficiency or has no latency tolerance, allocating the available communication slots to the next requesting node; and if the next requesting node has not reached its maximum aggregation efficiency and has latency tolerance, allocating the available communication slots, then examining scheduling information for another requesting node or allocating the available communication slots to the given requesting node if there is not another requesting node.

31. The method of claim 30, wherein the allocating comprises the Network Coordinator determining whether any of the flows can tolerate latency and if so, deferring allocation of communication slots to a later communication window for flows that can tolerate latency.

32. The method of claim 30, wherein the operations performed by the Network Coordinator further comprise evaluating the scheduling information for each of the requesting nodes in an order of priority, from a highest priority requesting node to a lowest priority requesting node.

33. The method of claim 30, wherein the latency tolerance information comprises a binary representation as to whether or not a flow can tolerate any latency.

34. The method of claim 30, wherein the latency tolerance information comprises information regarding an amount of latency a flow can tolerate.

35. The method of claim 30, wherein the operations performed by the Network Coordinator further comprise determining whether each of the plurality of requesting nodes is making a conventional reservation request or an opportunistic reservation request.

36. The method of claim 30, wherein the operations performed by the Network Coordinator further comprise allocating the available communication slots to requesting nodes making a conventional reservation request before allocating any remaining available communication slots to other requesting nodes based on the other requesting nodes' respective flow scheduling information and the bandwidth availability.

37. A method for scheduling network communications in a managed network having a Network Coordinator and a plurality of associated network nodes, the method comprising:
  a) receiving in the Network Coordinator a submission from each of a plurality of network nodes requesting, for their respective flows, reservation of one or more communication slots in a communication window, the submission including scheduling information comprising at least one of latency tolerance of the flow of its respective requesting network node and whether the requesting network node has reached its maximum aggregation amount;
  b) the Network Coordinator checking available bandwidth in the communication window;
  c) the Network Coordinator allocating the available bandwidth to a first flow from a first requesting node based on the first flow's scheduling information and the bandwidth availability, and deferring allocation of bandwidth to a second flow from a second requesting node until a later window based on the second flow's scheduling information and the bandwidth availability, thereby reallocating peak demand among the plurality of requesting nodes across a plurality of communication windows;
  d) the Network Coordinator communicating reservation information to the plurality of requesting network nodes; and
  e) allocating the available communication slots to requesting nodes making a conventional reservation request before allocating any remaining available communication slots to other requesting nodes based on the other requesting nodes' respective flow scheduling information and the bandwidth availability.

38. The method of claim 37, wherein the allocating comprises the Network Coordinator determining whether any of the flows can tolerate latency and if so, deferring allocation of communication slots to a later communication window for flows that can tolerate latency.

39. The method of claim 37, wherein the operations performed by the Network Coordinator further comprise evaluating the scheduling information for each of the requesting nodes in an order of priority, from a highest priority requesting node to a lowest priority requesting node.

40. The method of claim 37, wherein the latency tolerance information comprises a binary representation as to whether or not a flow can tolerate any latency.

41. The method of claim 37, wherein the latency tolerance information comprises information regarding an amount of latency a flow can tolerate.

42. The method of claim 37, wherein the operations performed by the Network Coordinator further comprise determining whether each of the plurality of requesting nodes is making a conventional reservation request or an opportunistic reservation request.

* * * * *